Feb. 19, 1957  J. G. THOMAS ET AL  2,781,712
CULTIVATOR
Filed July 27, 1954  2 Sheets-Sheet 1

INVENTORS
JAMES G. THOMAS
ALONZA G. ROBERTS
BY
J. Wesley Everett
ATTORNEY

Feb. 19, 1957 J. G. THOMAS ET AL 2,781,712
CULTIVATOR
Filed July 27, 1954 2 Sheets-Sheet 2
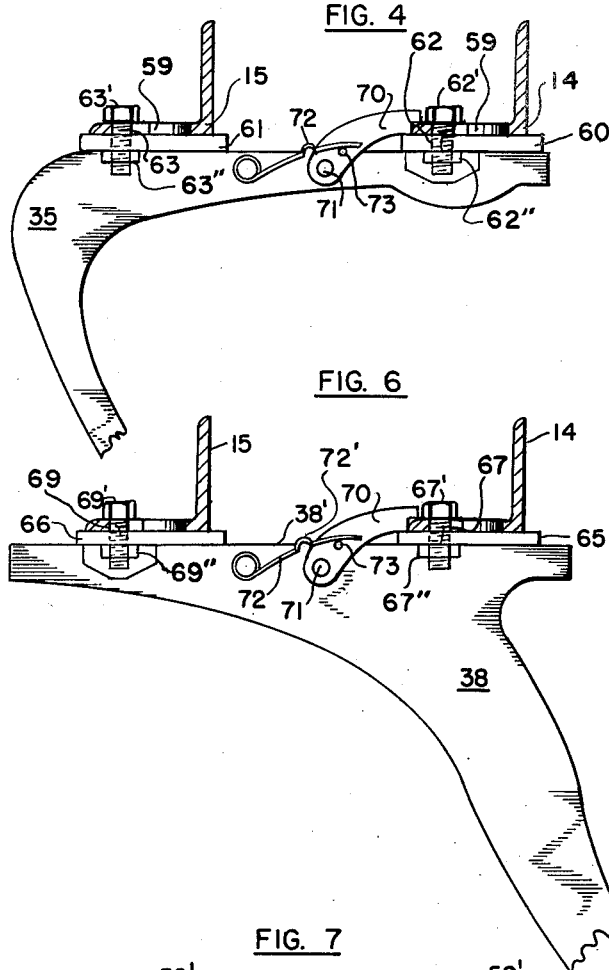
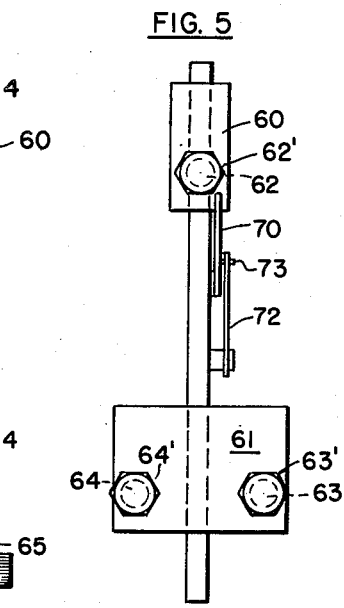
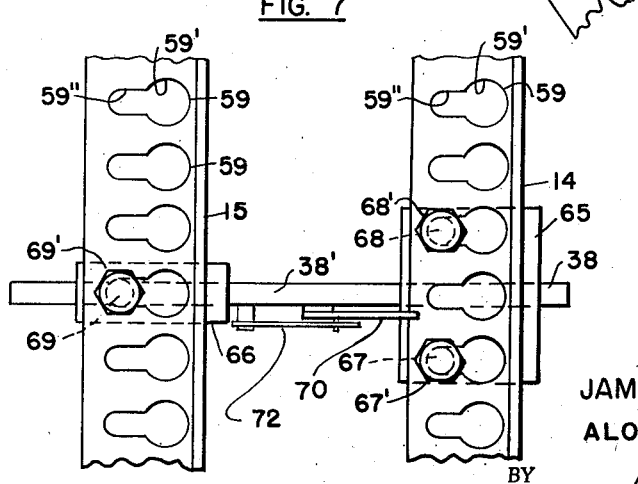
INVENTORS
JAMES G. THOMAS
ALONZA G. ROBERTS
BY
ATTORNEY

2,781,712

CULTIVATOR

James G. Thomas, Elizabethtown, and Alonza G. Roberts, Bladenboro, N. C.

Application July 27, 1954, Serial No. 446,116

3 Claims. (Cl. 97—198.1)

The present invention relates to an improved cultivator and in particular to one having an adjustable cultivator shank.

The improved shank is for use with cultivators particularly adapted to be attached to tractors. These cultivators are generally supported either wholly or partly by the tractor and are raised and lowered by hydraulic lifts. These cultivators are also of such width that they extend over two rows of plants, that is, they cultivate two rows at a time.

In many instances these rows of plants are not always of uniform width, but may vary with different types of plants, or by planting with different makes of machines.

It is the primary object of the present invention to provide a cultivator in which the shank of a cultivator may be easily and quickly relocated to conform to the width of the rows of plants.

Another object of the invention is to provide a particular type of fastening means for holding the shank to the cultivator frame.

A further object of the invention is to provide means for preventing the shank from becoming accidently disengaged from the frame.

While several objects of the invention have been pointed out, other objects, uses, and advantages will become more apparent as the nature of the invention is more fully disclosed which consists in its novel construction, combination and arrangement of parts as shown in the accompanying drawing and described in the following description and specifically pointed out in the appended claims.

Figure 4 is an enlarged fragmentary sectional view taken along line 4—4 of Figure 2.

Figure 5 is a top plan view of the same.

Figure 6 is an enlarged fragmentary sectional view taken along line 6—6 of Figure 2.

Figure 7 is a top plan view of the shank shown in Figure 2 including a fragmentary portion of the cultivator frame.

In referring to the drawings, like references are used to indicate like and similar parts throughout the several views when practical.

Figure 1:
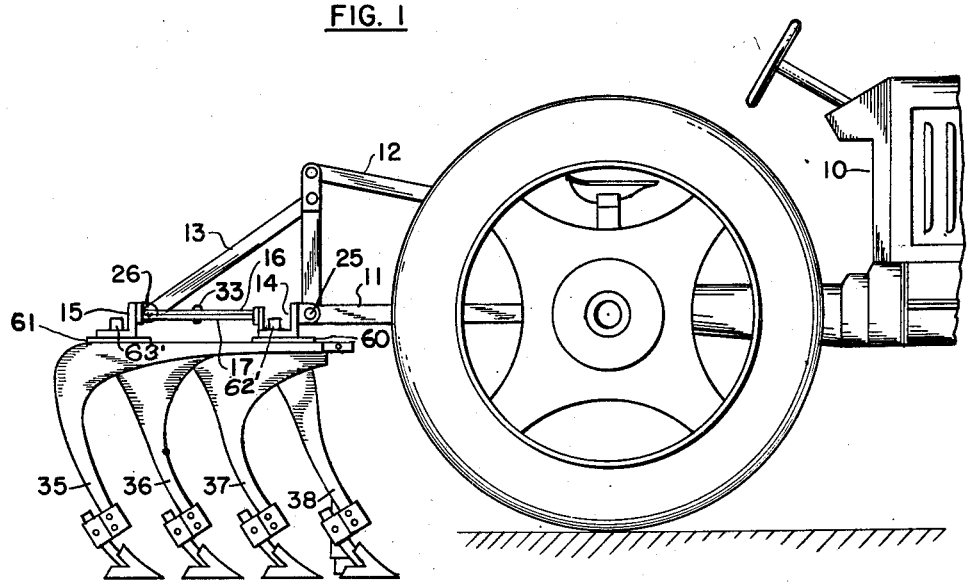
Figure 1 is a view in elevation of the cultivator and tractor.
Figure 2:
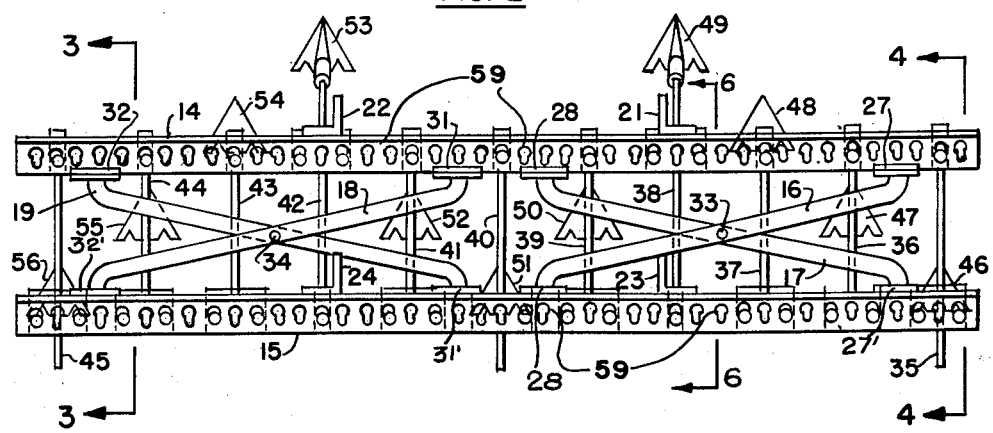
Figure 2 is a plan view of the cultivator only.
Figure 3:
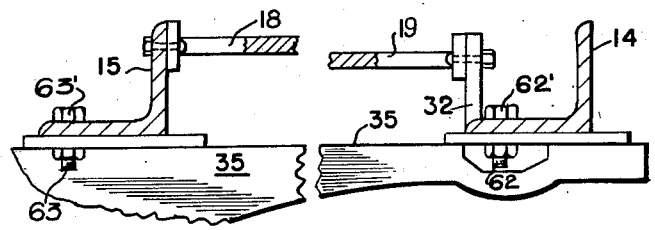
Figure 3 is an enlarged fragmentary sectional view taken along line 3—3 of Figure 2.

In Figure 1 the assembled cultivator is shown attached to a tractor 10 by the members 11, 12, 13. The cultivator is raised and lowered generally by hydraulic pistons (not shown) which places it in a position to either engage or be disengaged with the soil.

The cultivator itself is provided with a main frame having two parallel horizontal frame members 14 and 15, which are held in a fixed position by the cross-braces 16 and 17 on one end, and 18 and 19 on its opposite end. Secured to the forward main frame member 14 are bracket members 21 and 22 and secured to the rear main frame member are bracket members 23 and 24. These members are attachable to the members 11 and 13 by the pins 25 and 26, which in turn secure the cultivator frame to the tractor.

Referring again to the cross-brace members, the front ends of the members 16 and 17 are secured to the front frame member 14 by the brackets 27 and 28 and their opposite ends are connected to the frame member 15 by the brackets 27' and 28' and the front ends of cross braces 18 and 19 are secured to the front frame member 14 by the brackets 31 and 32 and their opposite ends are secured to the vertical side of rear frame member 15 by the brackets 31' and 32'. The cross braces 16 and 17; 18 and 19 are fastened at their cross-over points by suitable pins 33 and 34. By this construction the main frame members 14 and 15 are spaced apart at a predetermined distance. This is desirable because of the manner in which the tooth shanks are attached to the frame.

The tooth shanks are supported downwardly beneath the frame as indicated by numerals 35 to 45 inclusive. On the end of each shank is a cultivator tooth as indicated by numerals 46 to 56 inclusive.

Each shank has preferably attached to its upper surface, a plate, or a pair of plates as indicated at 60 and 61, and shown best in Figures 4, 5 and 7. Extending above the surface of the plates are pins or threaded studs 62, 63, and 64 having enlarged corresponding hexagon heads 62', 63', and 64'. The length of these studs from the top of the plate to the under surface of the heads is substantially the same as the thickness of the main frame members 14 and 15 but are adjustable for different frame member thicknesses. Referring again to plates 60 and 61, it will be noted that the wider plate 61 carries two studs while the narrow plate 60 carries only a single stud. The plates 60 and 61 are provided with threaded holes for threadably receiving the threaded studs. For holding the studs in a particular position, or in clamped position upon the frame, there is provided on the outer end of the studs a lock nut as shown at 62" and 63". These lock nuts engage the lower surface of the respective plates 60 and 61 for locking the stud in place.

For shanks, such as 38 and 42, where the tooth is carried forward or adjacent a vertical line with front frame member the plates and studs are reversed, as the major portion of the strain will be on the front frame member. This is illustrated in Figures 6 and 7. In these figures a wide plate 65 is located upon the front upper surface 38 of the shank and a narrow plate 66 is located on the rear upper surface of the shank. These plates are provided with identical studs 67, 68, and 69 with corresponding hexagon heads 67', 68', and 69'. As stated hereinbefore, the studs and plates are fixed and carried on the cultivator shank at predetermined distances, which is substantially that of the distance between the frame members 14 and 15. These studs are also threaded as previously described for studs 62, 63, and 64 and are threadably engageable with the plate members 60 and 61. There is also provided lock nuts as shown at 67" and 69" for locking the studs in position.

The frame members are preferably constructed of an angle material having a horizontal and vertical flat side. These frame members 14 and 15 are provided with a plurality of evenly spaced apertures 59 of a keyhole type, that is, they have a large opening 59' at one end and a narrower slotted portion 59" extending outwardly from one side of the larger opening. The large ends of these apertures are positioned toward the front of the frame and are of the size as to freely receive the upwardly extended heads of the studs. The narrow slotted portion of the apertures is of such size as to allow the stud shank to freely slide along the slot, the head moving over the upper surface of the area surrounding the slotted portion to hold the shank in operating position. As all the apertures are identical there is no need to go into detail for more than one, or for such members as will be set forth giving their necessary particular structure and function.

After the shank studs have been moved to the narrow portion of the slot, they may be tightened down upon the frame members 14 and 15 and the lock nuts beneath the respective plates run up on the studs adjacent the under surface of the plates to prevent the studs from loosening. There is also provided a latch 70 pivotedly mounted upon the shank at 71 which is moved in contact with the rear edge of front frame member 14 to prevent the shank from accidently moving forward and allowing the studs to become disengaged from the slots in the frame. In order to hold the latch in contact with the frame member there is provided a spring member 72 which is also carried by the shank. The spring bears against a small pin 73 for holding the latch in a downwardly and forward position. When the shank is to be attached or removed from the frame, the latch is lifted until the pin 73 engages a small notch 72' in the spring 72 which holds the latch in more or less an upright position.

By having the keyhole apertures 59 formed relatively close together and evenly spaced along the frame members 14 and 15 the shank may be adjusted laterally to provide for shifting the teeth to conform with the width of the row.

With a structure as illustrated in the present invention, any one of the teeth may be quickly and easily disengaged from the frame by releasing the latch and moving the shank forward until the heads of the pins register with the large end of the apertures, when they may be withdrawn. The shank may be just as conveniently attached by reversing the steps for removing it and closing the latch against the rear edge of the forward frame member. This saves considerable time in changing the position of the teeth.

While a particular form of the invention has been illustrated and described in detail, it is not intended to be a limitation, as the general principle set forth herein may be incorporated into many modified forms, therefore the scope of the invention is best defined in the appended claims.

We claim:

1. A tractor cultivator comprising, in combination, a horizontal rigid frame adapted to be fixedly supported upon the tractor, the horizontal frame including at least two fixed spaced memers, said members having a plurality of keyhole shaped slots evenly spaced along the two members and the slots in the two members being evenly aligned with each other for supporting a plurality of tooth carrying shanks, each shank having a pair of fixed plates carried across its upper edge, the said plates being so located on the shank as to contact the under surface of the horizontal frame members, at least a pair of studs extending upwardly from one of the said plates, at least a single stud extending upwardly from the other plate, said studs having body portions of such size as to be slidably receivable into the smaller portions of the keyhole slots and heads on the upper ends thereof of such size as to be slidable through the large openings of the keyhole slots, the distance of the heads of the studs from the plates being substantially the same as the thickness of the horizontal frame member, whereby the stud heads are slidable along the upper surface of the frame member adjacent the slots as the studs are slid to the smaller end of the keyhole slot.

2. A tractor cultivator as claimed in claim 1 having a releasable latch cooperating between the shank and the frame for holding the stud bodies in the smaller area of the keyhole slots.

3. A tractor cultivator as claimed in claim 1 having a releasable latch cooperating between the shank and the rear edge of one of the horizontal frame members for holding the stud bodies in the smaller area of the keyhole slots.

References Cited in the file of this patent

UNITED STATES PATENTS

| 320,834 | Argerbright | June 23, 1885 |
| 661,755 | Cheheyl | Nov. 13, 1900 |
| 1,900,440 | Ferguson | Mar. 7, 1933 |

FOREIGN PATENTS

| 609,358 | Great Britain | Sept. 29, 1948 |